(12) United States Patent
Yamashiro et al.

(10) Patent No.: US 9,876,980 B2
(45) Date of Patent: Jan. 23, 2018

(54) SYSTEM FOR SAVING VEHICLE EXTERIOR IMAGE, APPARATUS FOR SAVING VEHICLE EXTERIOR IMAGE, AND INTER-VEHICLE COMMUNICATION APPARATUS

(71) Applicant: DENSO CORPORATION, Kariya, Aichi-pref (JP)

(72) Inventors: Takahisa Yamashiro, Chiryu (JP); Seigou Kumabe, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 181 days.

(21) Appl. No.: 14/772,738

(22) PCT Filed: Feb. 4, 2014

(86) PCT No.: PCT/JP2014/000578
§ 371 (c)(1),
(2) Date: Sep. 3, 2015

(87) PCT Pub. No.: WO2014/136378
PCT Pub. Date: Sep. 12, 2014

(65) Prior Publication Data
US 2015/0381919 A1    Dec. 31, 2015

(30) Foreign Application Priority Data
Mar. 4, 2013    (JP) .................. 2013-041864

(51) Int. Cl.
*H04N 5/44*    (2011.01)
*G06T 7/00*    (2017.01)
(Continued)

(52) U.S. Cl.
CPC .............. *H04N 5/44* (2013.01); *B60R 11/04* (2013.01); *G06K 9/00805* (2013.01);
(Continued)

(58) Field of Classification Search
CPC ...... H04N 5/44; G06K 9/00805; B60R 11/04; G07C 5/0866; G07C 5/008; G08G 1/09
See application file for complete search history.

(56) References Cited

U.S. PATENT DOCUMENTS

2011/0057783 A1*  3/2011  Yagi ......................... B60R 1/00
                                                                 340/436
2014/0292545 A1* 10/2014  Nemoto ................. G08G 1/163
                                                                 340/988

FOREIGN PATENT DOCUMENTS

JP          2004075023 A    3/2004
JP             3775336 B2    5/2006
(Continued)

OTHER PUBLICATIONS

International Search Report and Written Opinion (in Japanese with English Translation) for PCT/JP2014/000578, dated May 13, 2014; ISA/JP.

*Primary Examiner* — Christopher S Kelley
*Assistant Examiner* — Nasim Nirjhar
(74) *Attorney, Agent, or Firm* — Harness, Dickey & Pierce, P.L.C.

(57) ABSTRACT

Vehicle exterior images are captured sequentially by an imaging portion of an imaging-equipped mobile terminal used in a first vehicle and stored temporarily in an image temporary-storage portion in the first vehicle. The first vehicle receives vehicle information from a second vehicle different from the first vehicle, through inter-vehicle communication. When it is determined that a sudden deceleration arises in the second vehicle based on the vehicle information received by the first vehicle, the vehicle exterior images stored in the image temporary-storage portion are read and saved in a memory.

15 Claims, 8 Drawing Sheets

(51) Int. Cl.
*G06K 9/00* (2006.01)
*B60R 11/04* (2006.01)
*G07C 5/00* (2006.01)
*G07C 5/08* (2006.01)
*G08G 1/09* (2006.01)

(52) U.S. Cl.
CPC ........... *G07C 5/008* (2013.01); *G07C 5/0866* (2013.01); *G08G 1/09* (2013.01)

(56) References Cited

FOREIGN PATENT DOCUMENTS

| | | | |
|---|---|---|---|
| JP | 2006231942 | A | 9/2006 |
| JP | 2008158987 | A | 7/2008 |
| JP | 2009237945 | A | 10/2009 |
| JP | 2010020485 | A | 1/2010 |
| JP | 2010072845 | A | 4/2010 |

* cited by examiner

SYSTEM FOR SAVING VEHICLE EXTERIOR IMAGE, APPARATUS FOR SAVING VEHICLE EXTERIOR IMAGE, AND INTER-VEHICLE COMMUNICATION APPARATUS

CROSS REFERENCE TO RELATED APPLICATIONS

This application is a U.S. National Phase Application under 35 U.S.C. 371 of International Application No. PCT/JP2014/000578 filed on Feb. 4, 2014 and published in Japanese as WO 2014/136378 A1 on Sep. 12, 2014. This application is based on and claims the benefit of priority from Japanese Patent Application No. 2013-041864 filed on Mar. 4, 2013. The entire disclosures of all of the above applications are incorporated herein by reference.

TECHNICAL FIELD

The present disclosure relates to a vehicle exterior image saving system that captures a vehicle exterior image in a forward direction of a second vehicle that has suddenly decelerated and saves the captured image in a first vehicle other than the second vehicle, and relates to a vehicle exterior image saving apparatus and an inter-vehicle communication apparatus that are included in the vehicle exterior image saving system.

BACKGROUND ART

Patent literature 1 discloses a well-known art of saving, in a recording apparatus, a vehicle exterior image in a forward direction of a subject vehicle captured by a camera in an interior of the subject vehicle when the subject vehicle has suddenly decelerated.

PRIOR ART LITERATURES

Patent Literature

Patent Literature 1: JP 2008-158987 A

SUMMARY OF INVENTION

The art disclosed in Patent literature 1, which thus saves the vehicle exterior image in the forward direction of the subject vehicle captured by the camera in the interior of the subject vehicle in the recording apparatus, only serves to save the vehicle exterior image from a viewpoint of the subject vehicle that has suddenly decelerated.

An object of the present disclosure is to provide a vehicle exterior image saving system, a vehicle exterior image saving apparatus, and an inter-vehicle communication apparatus, which can capture and save a vehicle exterior image in a forward direction of a second vehicle that has suddenly decelerated from a viewpoint of a first vehicle other than the second vehicle.

According to an example of the present disclosure, a vehicle exterior image saving system is provided to include a vehicle exterior image saving apparatus used in a first vehicle and an inter-vehicle communication apparatus used in a second vehicle that is different from the first vehicle. The vehicle exterior image saving apparatus includes (i) a vehicle exterior image acquisition section that acquires a vehicle exterior image in a forward direction of the first vehicle, the vehicle exterior image being captured by an imaging apparatus used in the first vehicle; (ii) a saving section that saves the vehicle exterior image acquired in the vehicle exterior image acquisition section; and (iii) a first communication section that transmits and receives information by inter-vehicle communication. The inter-vehicle communication apparatus includes (i) a sudden-deceleration information acquisition section that acquires vehicle information about the second vehicle to determine a sudden deceleration of the second vehicle; and (ii) a second communication section that transmits and receives information by the inter-vehicle communication. Either the inter-vehicle communication apparatus or the vehicle exterior image saving apparatus includes a sudden-deceleration determination section that makes a determination as to whether or not a sudden deceleration arises in the second vehicle from the vehicle information acquired in the sudden-deceleration information acquisition section. The saving section of the vehicle exterior image saving apparatus saves the vehicle exterior image in the forward direction of the first vehicle, the vehicle exterior image being acquired in the vehicle exterior image acquisition section, on a basis of the determination that the sudden deceleration arises in the second vehicle, made by the sudden-deceleration determination section.

That is, suppose that a sudden-deceleration determination section determines a sudden deceleration of the second vehicle from vehicle information about the second vehicle acquired by a sudden-deceleration information acquisition section of the second vehicle. This leads to saving the vehicle exterior image in the forward direction of the first vehicle captured by an imaging apparatus used in the first vehicle in a saving section of the first vehicle. The first vehicle other than the second vehicle is therefore enabled to save, when the second vehicle has suddenly decelerated, the vehicle exterior image in the forward direction of the first vehicle. The vehicle exterior image in the forward direction of the first vehicle including an area forward of the second vehicle signifies that the first vehicle has captured the vehicle exterior image in the forward direction of the second vehicle that has suddenly decelerated. This enables to save the vehicle exterior image in the forward direction of the second vehicle, which is captured from the viewpoint of the first vehicle other than that of the second vehicle having suddenly decelerated.

The vehicle exterior image saving apparatus, which is used in the vehicle exterior image saving system, can similarly save the vehicle exterior image of the second vehicle, which is captured from the viewpoint of the first vehicle other than that of the second vehicle having suddenly decelerated.

The inter-vehicle communication apparatus serves to transmit, when the sudden-deceleration determination section of the inter-vehicle communication apparatus determines a sudden deceleration of the second vehicle, information to save the vehicle exterior image in the forward direction of the first vehicle in the vehicle exterior image saving apparatus. The inter-vehicle communication apparatus can save the vehicle exterior image of the second vehicle, which is captured from the viewpoint of the first vehicle other than that of the second vehicle having suddenly decelerated.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Hereafter, embodiments of the present disclosure are described in reference to the drawings.

First Embodiment

Figure 1:
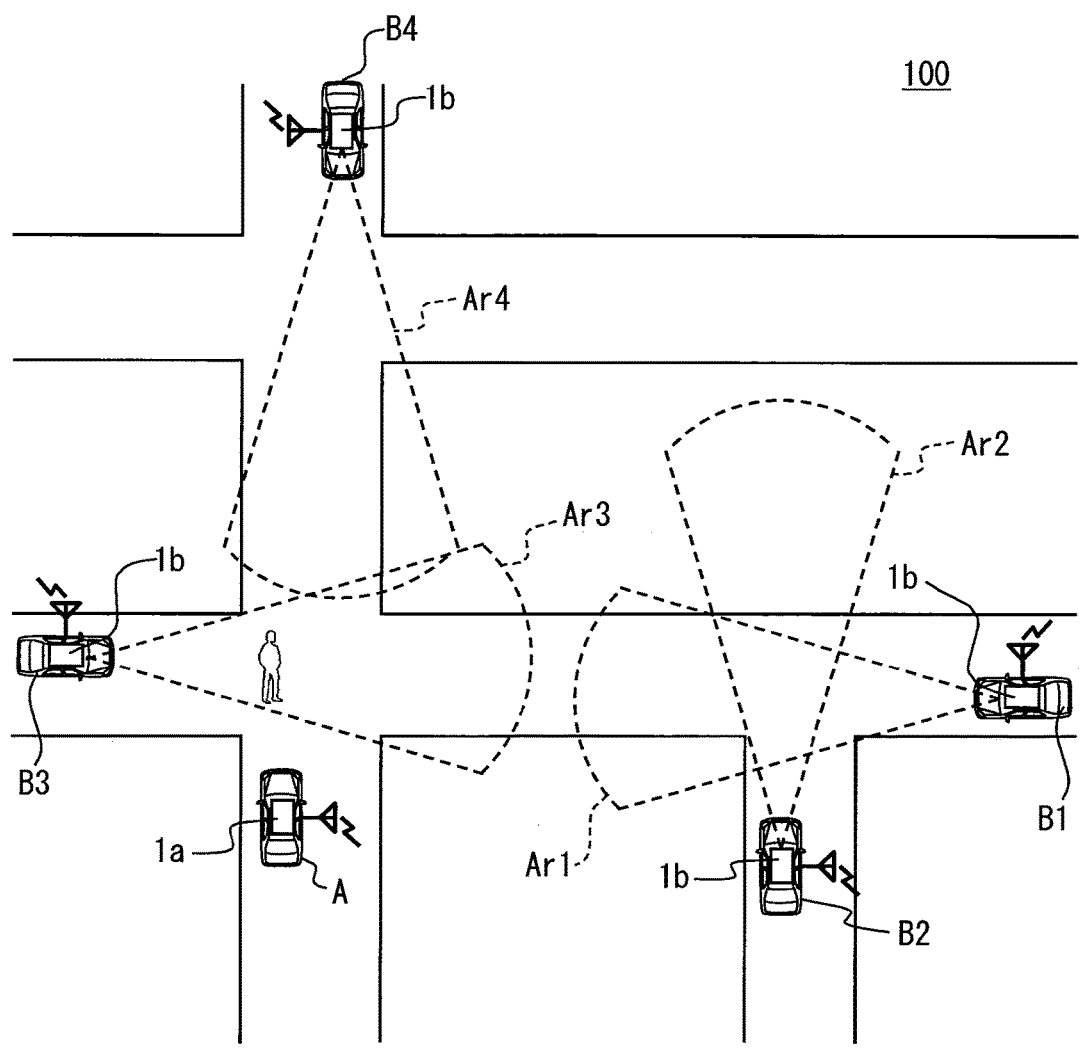
FIG. 1 illustrates a schematic configuration of a drive recorder system.

FIG. 1 illustrates an example of a schematic configuration of a drive recorder system 100 to which the present disclosure has been applied. The drive recorder system 100 in FIG. 1 includes a drive recorder unit 1 used in each of multiple vehicles (vehicles A, B1 to B4). The following will describe a vehicle that suddenly decelerates as the vehicle A, and vehicles around the vehicle A as the vehicles B1 to B4. The vehicle A is also called a second vehicle. The vehicles B1 to B4 are also called first vehicles. A vehicle mounting a subject apparatus or a vehicle using the subject apparatus is called a host vehicle or subject vehicle.

Note that the drive recorder unit 1 used in the vehicle A is called a drive recorder unit 1a, and the drive recorder unit 1 used in the vehicles B1 to B4 is called a drive recorder unit 1b, as needed. The drive recorder system 100 is also called a vehicle exterior image saving system. The drive recorder unit 1b is also called a vehicle exterior image saving apparatus.

Figure 2:
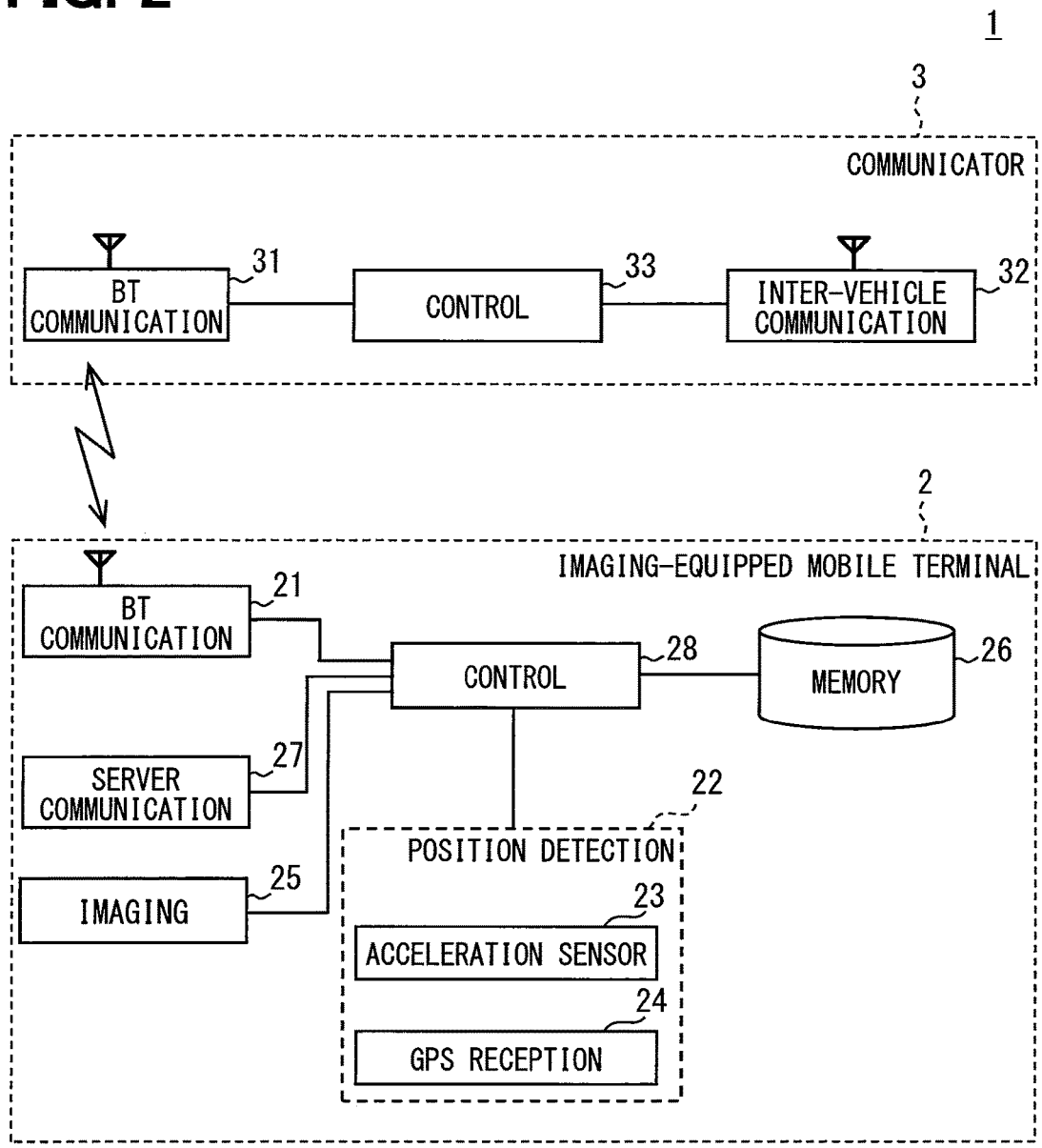
FIG. 2 illustrates an example of a schematic configuration of a drive recorder unit.

A schematic configuration of the drive recorder unit 1 is explained in reference to FIG. 2. FIG. 2 illustrates an example of the schematic configuration of the drive recorder unit 1. As in FIG. 2, the drive recorder unit 1 includes an imaging-equipped mobile terminal 2 and a communicator 3. The communicator 3 is also called an inter-vehicle communication apparatus.

The imaging-equipped mobile terminal 2 captures images of a predetermined range outside a host vehicle mounting or using the mobile terminal 2 (hereinafter, a vehicle exterior image). The imaging-equipped mobile terminal 2 may use a multifunctional mobile phone such as a smart phone with a camera. As an example, the imaging-equipped mobile terminal 2 is temporarily secured in the interior of the host vehicle to face to capture images in the forward direction of the host vehicle through the windshield.

The imaging-equipped mobile terminal 2 includes an in-terminal Bluetooth (registered trademark, hereinafter BT) communication portion 21, a position detector 22, an imaging portion 25, a memory 26, a server communication portion 27, and an in-terminal control unit 28.

The BT communication portion 21 has a transmission-reception antenna to transfer information to and from the communicator 3 of the host vehicle by the communications based on the standard of Bluetooth (henceforth, BT communication).

This application uses "information" not only as an uncountable noun but also as a countable noun. A plurality of informations are recognized as equivalent to a plurality of pieces of information or a plurality of information items.

The present embodiment has described, but is not limited to, the BT communications between the mobile terminal 2 and communicator 3. Wireless communications may be made based on a short-range wireless telecommunication standard such as ZigBee (registered trademark) and a wireless LAN standard such as IEEE 802.11. Cable communications may be also made using USB communications.

The position detector 22 sequentially detects the terminal positions on the basis of information acquired from each sensor such as an acceleration sensor 23 that detects an acceleration of a host terminal and a GPS receiver 24 for the GPS (global positioning system) that detects a current position of the host terminal (hereinafter, a terminal position) according to electric waves from satellites.

These sensors, having different natures of errors, are configured complementarily. In dependence on an accuracy of each sensor, part of the above sensors may be used for the configuration. A sensor other than the above sensors may be used for the configuration. The terminal position is expressed by a latitude and longitude.

The imaging portion 25 is a color camera having imaging lenses on the front and rear surfaces of the imaging-equipped mobile terminal 2. The imaging portion 25 is also called an imaging apparatus. The imaging portion 25 sequentially captures images in a predetermined range faced by the imaging lens. When the mobile terminal 2 faces to capture an image in the forward direction of the host vehicle through the windshield, the imaging portion 25 sequentially captures vehicle exterior images in the forward direction of the host vehicle. The imaging portion 25 may use a CMOS camera and a CCD camera. The imaging lens may use a wide angle lens.

The memory 26 is an electrically rewritable nonvolatile memory to save the vehicle exterior images captured by the imaging portion 25. The memory 26 may be a storage medium such as a SD card dismountable from the imaging-equipped mobile terminal 2. The memory 26 holds records of the vehicle exterior images for longer time than an image temporary-storage portion 285 mentioned later. For example, the memory 26 may not delete the saved vehicle exterior images unless a user instructs the deletion via an unillustrated manipulation input portion of the imaging-equipped mobile terminal 2. The memory 26 may not delete the saved vehicle exterior images unless the saved vehicle exterior images are transmitted to a server mentioned later.

The server communication portion 27 communicates with an unillustrated server that collects the vehicle exterior images captured by the imaging portion 25 via a network. The server communication portion 27 transmits the vehicle exterior images saved in the memory 26 to the server according to an instruction of the in-terminal control unit 28.

The in-terminal control unit 28 is also called an in-terminal control circuit, and is a normal computer including a well-known CPU; memories such as ROM, RAM, and EEPROM; an I/O; and bus lines (none of which are illustrated) that couples these components to each other. The control unit 28 performs various processes by making the CPU execute programs previously stored in the ROM on the basis of various informations inputted from the BT communication portion 21, position detector 22, and imaging portion 25.

Figure 4:
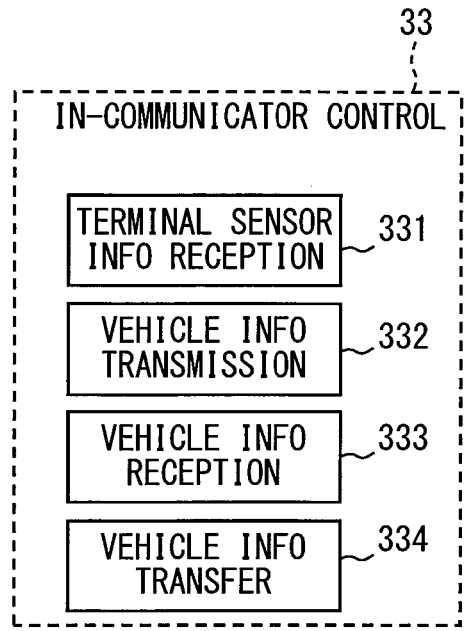
FIG. 4 is a functional block diagram illustrating an example of a schematic configuration of an in-terminal control unit in the first embodiment.

As in FIG. 4, the in-terminal control unit 28 includes, as a functional block, a terminal sensor information acquisition section 281, a sensor information accumulation portion 282, a terminal sensor information transmission section 283, a vehicle exterior image acquisition section 284, an image temporary-storage portion 285, a transfer information reception section 286, a different-vehicle sudden-deceleration determination section 287, a direction determination section 288, a distance calculation section 289, a distance determination section 290, and a saving section 291. The sensor information accumulation portion 282 and image temporary-storage portion 285 are structured in an electrically rewritable memory such as a RAM and EEPROM. Conveniently, some of functions of a general multifunctional mobile phone are unnecessary for explanation of the present disclosure, and thus not explained.

The terminal sensor information acquisition section 281 stores, in the sensor information accumulation portion 282, terminal sensor informations such as terminal positions sequentially detected by the position detector 22 and accelerations of the host terminal sequentially detected by the acceleration sensor 23. The terminal sensor informations are stored in the sensor information accumulation portion 282 in association with informations about times (namely, timestamps) at which the terminal sensor informations are detected. The sensor information accumulation portion 282 may delete the informations in the chronological order when the terminal sensor informations exceed the assigned memory in capacity. The terminal sensor informations that have been stored a predetermined time may be deleted.

The terminal sensor information transmission section 283 reads multiple sets of the terminal sensor informations stored in the sensor information accumulation portion 282 together with the timestamps when the terminal sensor information transmission section 283 receives a request to acquire the terminal sensor informations from the communicator 3 of the host vehicle via the BT communication portion 21. The read terminal sensor informations and timestamps are transmitted to the communicator 3 via the in-terminal BT communication portion 21. As an example, the terminal positions, the accelerations of the host terminal, and the timestamps of the positions and accelerations are transmitted. While multiple sets of the terminal positions are read, only a latest acceleration of the host terminal may be read.

The vehicle exterior image acquisition section 284 acquires the vehicle exterior images sequentially captured in the imaging portion 25, and stores the images in the image temporary-storage portion 285. The vehicle exterior images are temporarily stored in the image temporary-storage portion 285 together with timestamps at which the images are captured. The image temporary-storage portion 285 may sequentially delete the vehicle exterior images in the chronological order when the images exceed the assigned memory in capacity. The vehicle exterior images that have been stored a predetermined time may be deleted.

The present embodiment describes, but is not limited to, the configuration where the image temporary-storage portion 285 is formed in the memory of the in-terminal control unit 28. The image temporary-storage portion 285 may be formed in a memory of the imaging-equipped mobile terminal 2 instead of the memory of the in-terminal control unit 28.

The transfer information reception section 286 receives below-mentioned vehicle information that the communicator 3 of the host vehicle receives from the communicator 3 of a different vehicle via the in-terminal BT communication portion 21. The transfer information reception section 286 is also called a sudden-deceleration information acquisition section. The different-vehicle sudden-deceleration determination section 287, direction determination section 288, distance calculation section 289, distance determination section 290, and saving section 291 are explained below in detail.

Returning to FIG. 2, the communicator 3 transmits and receives information to and from the communicators 3 of surrounding vehicles through inter-vehicle communications. The communicator 3 may be not only a vehicle-mounted one but also a portable one brought into a vehicle by a user. The communicator 3 includes an in-communicator BT communication portion 31, an inter-vehicle communication portion 32, and an in-communicator control unit 33.

The in-communicator BT communication portion 31 has a transmission-reception antenna to perform BT communications with the imaging-equipped mobile terminal 2 of the host vehicle for information transfer.

The inter-vehicle communication portion 32 includes a transmission-reception antenna to wirelessly transmit and receive information to and from the communicators 3 of the surrounding vehicles for inter-vehicle communications without a telephone network. The inter-vehicle communications with the communicators 3 of the surrounding vehicles in a radius of about 1 km around the host vehicle may be performed using a 700 MHz band. The inter-vehicle communications with the communicators 3 of the surrounding vehicles in a radius of about 500 m around the host vehicle may be performed using a 5.9 GHz band. The inter-vehicle communication portion 32 transmits information at a transmission period according to an instruction of the in-communicator control unit 33.

The in-communicator control unit 33 is also called an in-communicator control circuit, and is a normal computer including a well-known CPU; memories such as a ROM, RAM, and EEPROM; an I/O; and bus lines that couples these components to each other (none of which are illustrated). The in-communicator control unit 33 performs various processes by making the CPU execute programs previously stored in the ROM on the basis of various informations inputted from the in-communicator BT communication portion 31 and inter-vehicle communication portion 32.

Figure 3:
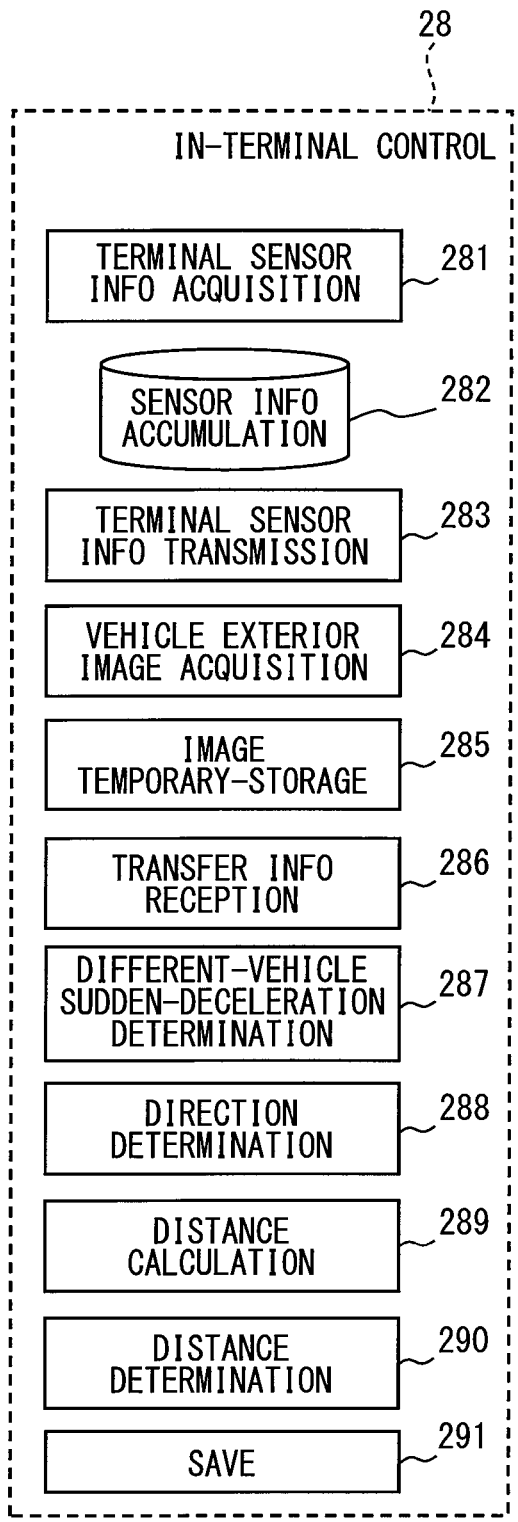
FIG. 3 is a functional block diagram illustrating an example of a schematic configuration of an in-communicator control unit in a first embodiment.

As in FIG. 3, the in-communicator control unit 33 includes a terminal sensor information reception section 331, a vehicle information transmission section 332, a vehicle information reception section 333, and a vehicle information transfer section 334 as a functional block.

The terminal sensor information reception section 331 receives terminal sensor information transmitted from the imaging-equipped mobile terminal 2 via the in-communicator BT communication portion 31. The vehicle information transmission section 332 generates vehicle information about the host vehicle from the terminal sensor information received in the terminal sensor information reception section 331, and transmits the generated vehicle information via the inter-vehicle communication portion 32. The vehicle information transmission section 332 is also called a second communication section.

The vehicle information reception section 333 receives the above vehicle information transmitted from the communicator 3 of a different vehicle via the inter-vehicle communication portion 32. The vehicle information reception section 333 is also called a first communication section. The vehicle information transfer section 334 transmits the vehicle information received in the vehicle information reception section 333 to the imaging-equipped mobile terminal 2 of the host vehicle via the in-communicator BT communication portion 31.

Figure 5:
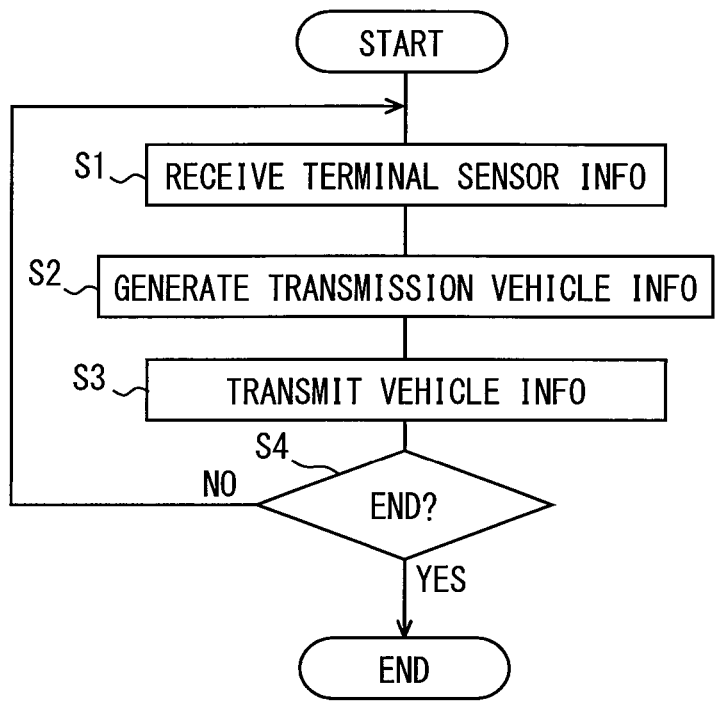
FIG. 5 is a flowchart illustrating an example of vehicle information transmission related processing in the in-communicator control unit of a communicator.

Processing related to transmission of the vehicle information in the in-communicator control unit 33 of the communicator 3 (hereinafter, vehicle information transmission related processing) is explained in reference to a flowchart of FIG. 5. The flowchart of FIG. 5 may start when power of the communicator 3 is turned on.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

First, at S1, the terminal sensor information reception section 331 receives terminal sensor information, and the flowchart proceeds to S2. The terminal sensor information reception processing transmits a request to acquire terminal sensor information to the imaging-equipped mobile terminal 2 via the in-terminal BT communication portion 21, and receives the terminal sensor information returned from the imaging-equipped mobile terminal 2 in response to the acquisition request via the in-terminal BT communication portion 21.

This processing is not limited to the configuration where the request to acquire the terminal sensor information is transmitted from the communicator 3 to the imaging-equipped mobile terminal 2 and the terminal sensor information reception section 331 receives the terminal sensor information returned in response to this acquisition request. Latest terminal sensor information stored in the sensor information accumulation portion 282 may be transmitted from the imaging-equipped mobile terminal 2 periodically. The terminal sensor information reception section 331 may receive the transmitted terminal sensor information sequentially.

At S2, the vehicle information transmission section 332 performs to-be-transmitted vehicle information generation processing, and the flowchart proceeds to S3. The to-be-transmitted vehicle information generation processing generates the vehicle information to be transmitted via the inter-vehicle communications from the terminal sensor information received by the terminal sensor information reception section 331.

For example, the vehicle information may be generated using a terminal position as a vehicle position of the host vehicle. The present embodiment describes an example specifying the imaging direction in the imaging portion 25 to face the forward direction of the host vehicle. This example generates the vehicle information using an imaging-directional acceleration out of accelerations of the host terminal as a longitudinal acceleration of the host vehicle, the imaging-directional acceleration arising in the same direction as the imaging direction in the imaging portion 25. The vehicle information may include at least the longitudinal acceleration of the host vehicle. The to-be-transmitted vehicle information generation processing generates the vehicle information using, as an orientation of the host vehicle (namely, traveling direction), an orientation of extension of an approximate line found by the method of least squares from chronologically arranged multiple terminal positions.

The configuration where the orientation of the host vehicle in the vehicle information is found from the terminal positions has been described but is not limited. When the imaging-equipped mobile terminal 2 includes a geomagnetic sensor and a detection result of this geomagnetic sensor is available, the orientation of the host vehicle may be determined using the detection result of the geomagnetic sensor.

The longitudinal acceleration of the host vehicle may be also calculated from the terminal positions as follows. First, a speed of the host vehicle is calculated by calculating a travel of the host vehicle using the host terminal per unit of time from the chronologically arranged multiple terminal positions. Then, a time differential value of the sequentially calculated vehicle speeds is calculated, and treated as a longitudinal acceleration of the host vehicle.

The present embodiment describes, but not limited to, the configuration where the vehicle information is generated from the terminal sensor information acquired from the imaging-equipped mobile terminal 2. When the communicator 3 includes at least a receiver of a global positioning system like the GPS receiver 24, the vehicle information is generated from detectable positions of the communicator 3 of the host vehicle by using this receiver. In this case, the longitudinal acceleration and orientation of the host vehicle are calculated from the positions of the communicator 3 of the host vehicle through a similar method to the above calculation method using the terminal positions.

At S3, the vehicle information transmission section 332 transmits the vehicle information, and the flowchart proceeds to S4. The vehicle information generated in the to-be-transmitted vehicle information generation processing is transmitted via the inter-vehicle communication portion 32. The vehicle information generated in the to-be-transmitted vehicle information generation processing is also called position-and-orientation determination information. The vehicle information is transmitted at a transmission period of the inter-vehicle communications in the communicators 3, such as every 100 msec.

The vehicle information transmitted in the vehicle information transmission processing includes the vehicle position of the host vehicle, the longitudinal acceleration of the host vehicle, the orientation of the host vehicle, the timestamps of the acceleration and orientation, and identification information that identifies the vehicle from which the vehicle information is transmitted. The identification information uses a vehicle ID to identify the host vehicle and an apparatus ID to identify the communicator 3 of the host vehicle.

At S4, when the vehicle information transmission related processing is at the end (YES at S4), the flowchart ends. When the vehicle information transmission related processing is not at the end (NO at S4), the flowchart returns to S1 and repeats. An example at the end of the vehicle information transmission related processing includes a turn-off of the communicator 3.

Figure 6:
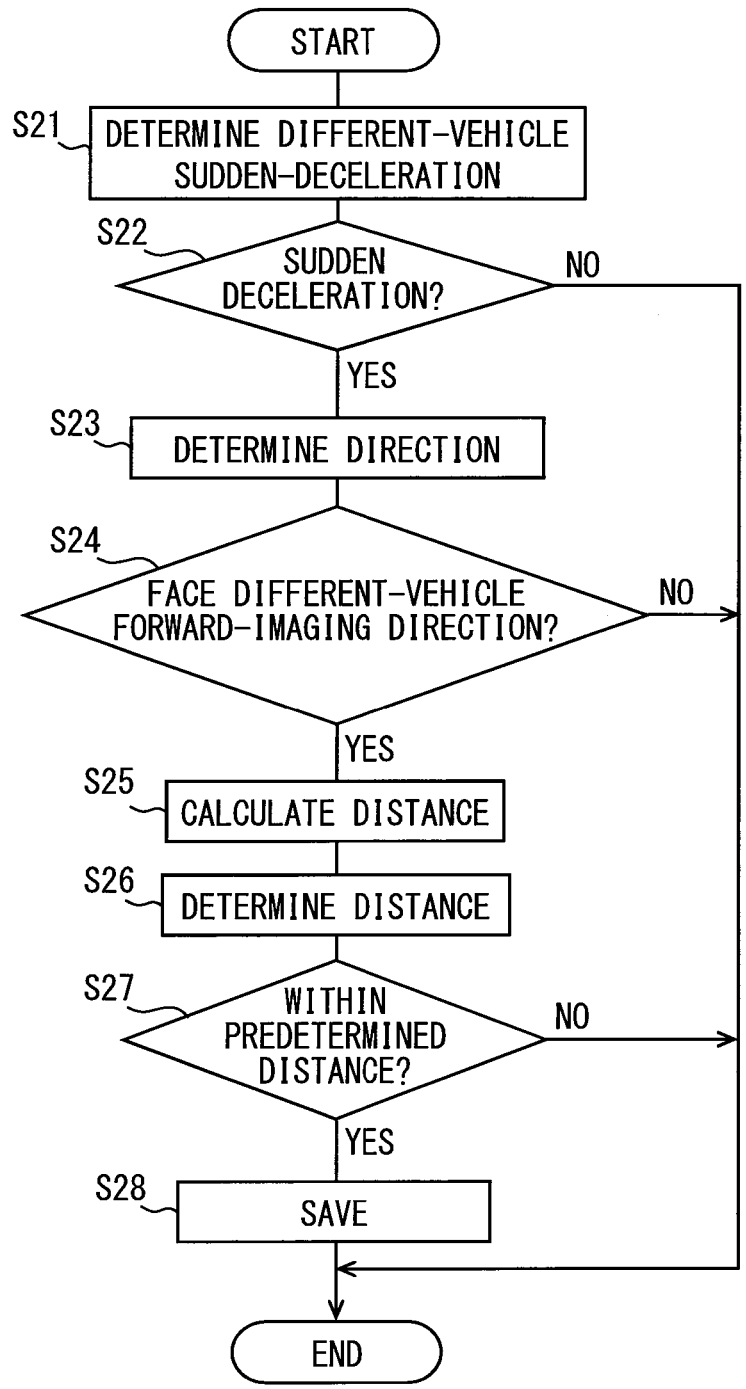
FIG. 6 is a flowchart illustrating an example of vehicle exterior image saving related processing in the in-terminal control unit of an imaging-equipped mobile terminal of the drive recorder unit.

The following explains the processing related to saving of the vehicle exterior images (hereinafter, vehicle exterior image saving related processing) when a sudden deceleration of the different vehicle is determined in the in-terminal control unit 28 of the imaging-equipped mobile terminal 2 of the drive recorder unit 1b, in reference to the flowchart of FIG. 6. The flowchart of FIG. 6 may start when the communicator 3 of the host vehicle receives the vehicle information from the communicator 3 of the different vehicle via the in-terminal BT communication portion 21.

First, at S21, the different-vehicle sudden-deceleration determination section 287 performs the different-vehicle sudden-deceleration determination processing, and the flowchart proceeds to S22. The different-vehicle sudden-deceleration determination section 287 is also called a sudden-deceleration determination section. The different-vehicle sudden-deceleration determination processing makes a determination as to whether the different vehicle has suddenly decelerated on the basis of a longitudinal acceleration of the different vehicle in the vehicle information received from the communicator 3 of the different vehicle. As an example, when the longitudinal acceleration of the different vehicle is a negative predetermined value or under, the different vehicle is determined to have suddenly decelerated. When the longitudinal acceleration does not reach the negative predetermined value, the different vehicle is determined to have not suddenly decelerated. The predetermined value here is any value equivalent to a sudden deceleration.

The present embodiment describes, but is not limited to, the configuration where the different-vehicle sudden-deceleration determination section 287 determines whether the different vehicle has suddenly decelerated on the basis of the longitudinal acceleration received from the communicator 3 of the different vehicle. The different-vehicle sudden-deceleration determination section 287 may determine whether the different vehicle has suddenly decelerated on the basis of the vehicle positions of the different vehicle received from the communicator 3 of the different vehicle. In this case, the vehicle speed of the different vehicle is calculated by calculating the travel of the different vehicle per unit of time from chronologically arranged multiple vehicle positions of the different vehicle. Then, a time differential value of sequentially calculated vehicle speeds may be calculated and treated as a longitudinal acceleration of the different vehicle. When the speeds of the different vehicle are acquirable as the vehicle information about the different vehicle, a time differential value of these vehicle speeds may be treated as a longitudinal acceleration of the different vehicle.

At S22, when the different vehicle is determined to have suddenly decelerated in the different-vehicle sudden-deceleration determination processing (YES at S22), the flowchart proceeds to S23. When the different vehicle is determined to have not suddenly decelerated in the different-vehicle sudden-deceleration determination processing (NO at S22), the flowchart ends without performing an after-mentioned saving process.

At S23, the direction determination section 288 performs direction determination processing, and the flowchart proceeds to S24. The direction determination processing determines whether the imaging portion 25 of the host terminal faces to image a forward direction of the different vehicle (hereinafter, a different-vehicle forward-imaging direction), from the vehicle position and orientation of the different vehicle that are received from the communicator 3 of the different vehicle and the vehicle position and orientation of the host vehicle. The different-vehicle forward-imaging direction is also called a second-vehicle forward-imaging direction.

The vehicle position of the host vehicle in the direction determination processing may use a terminal position, which has a timestamp closest to the timestamp of the vehicle position of the different vehicle received from the communicator 3 of the different vehicle, read from the terminal positions stored in the sensor information accumulation portion 282 of the host terminal.

The orientation of the host vehicle used in the direction determination processing may be acquired as follows. First, chronologically arranged multiple terminal positions having timestamps closer to the timestamp of the different-vehicle position received from the communicator 3 of the different vehicle are read from the terminal positions accumulated in the sensor information accumulation portion 282. An orientation of extension of an approximate line found from the read multiple terminal positions through the least square method is acquired as an orientation of the host vehicle.

Whether the imaging direction of the imaging portion 25 of the host terminal faces the different-vehicle forward-imaging direction may be determined as follows. First, suppose the two-dimensional coordinate of a y-axis of the latitude and an x-axis of the longitude. Here, a straight line extending in the orientation of the host vehicle from the vehicle position of the host vehicle is an imaging direction viewed from the host vehicle, whereas a straight line extending in the orientation of the different vehicle from the vehicle position of the different vehicle that is different from the host vehicle is an imaging direction viewed from the different vehicle. Whether these imaging directions intersect is found through calculation. When the directions intersect, it is determined that the imaging direction of the imaging portion 25 of the host terminal faces the different-vehicle forward-imaging direction. When the directions do not intersect, it is determined that the imaging direction of the imaging portion 25 of the host terminal does not face the different-vehicle forward-imaging direction.

When the imaging direction of the imaging portion 25 of the host terminal does not face the different-vehicle forward-imaging direction, it is determined that the imaging direction of the imaging portion 25 of the host terminal does not face the different-vehicle forward-imaging direction in the direction determination processing. The after-mentioned saving processing therefore enables to prevent a vehicle exterior image that does not include a forward area of the different vehicle from being wastefully saved.

When an angle of view of the imaging portion 25 is acquirable by the in-terminal control unit 28, a calculation may be made to find whether two straight lines extending from the vehicle position of the host vehicle in the orientations obtained by adding a half value of the angle clockwise and counterclockwise to the orientation of the host vehicle intersect with a straight line extending from the vehicle position of the different vehicle in the orientation of the different vehicle. This case may determine that the imaging direction of the imaging portion 25 of the host terminal faces the different-vehicle forward-imaging direction when an intersection is produced on at least any one of the two straight lines extending from the vehicle position of the host vehicle, and that the imaging direction of the imaging portion 25 of the host terminal does not face the different-vehicle forward-imaging direction when an intersection is not produced on any of the two straight lines.

Preferably, in the direction determination processing, only when a linear distance between the intersection and the vehicle position of the different vehicle is a predetermined threshold or less, it is determined that the imaging direction of the imaging portion 25 of the host terminal faces the different-vehicle forward-imaging direction. The predetermined threshold here is a distance between a vehicle and an obstacle, in response to which a driver is expected to suddenly decelerate the vehicle. The threshold is freely settable. The predetermined threshold may be tens of meters.

A determination that the imaging direction of the imaging portion 25 of the host terminal faces the different-vehicle forward-imaging direction is thus avoidable in the direction determination processing when the imaging direction of the imaging portion 25 faces the different-vehicle forward area that may be distant to be unrelated to a sudden deceleration of the different vehicle. In the saving processing described below, the vehicle exterior images in the area that may be unrelated to a sudden deceleration of the different vehicle can therefore be prevented from being wastefully saved.

At S24, when the imaging direction of the imaging portion 25 of the host terminal is determined to face the different-vehicle forward-imaging direction in the direction determination processing (YES at S24), the flowchart proceeds to S25. When the imaging direction of the imaging portion 25 of the host terminal is determined not to face the different-vehicle forward-imaging direction in the direction determination processing (NO at S24), the below-mentioned saving is not performed and the flowchart ends.

At S25, the distance calculation section 289 performs distance calculation processing, and the flowchart proceeds to S26. The distance calculation processing is to calculate a linear distance between the different vehicle and the host vehicle from the vehicle position of the different vehicle received from the communicator 3 of the different vehicle and the vehicle position of the host vehicle. The vehicle position of the host vehicle used in the distance calculation processing may use a terminal position, which is provided with a timestamp closest to the timestamp of the vehicle position of the different vehicle received from the communicator 3 of the different vehicle, read from the terminal positions accumulated in the sensor information accumulation portion 282 of the host terminal.

At S26, the distance determination section 290 performs the distance determination processing, and the flowchart proceeds to S27. The distance determination processing determines whether the linear distance between the host vehicle and the different vehicle calculated in the distance calculation processing is less than a predetermined distance. The predetermined distance here is any distance within which the different vehicle and an object forward of the different vehicle are included in a vehicle exterior image of the host terminal and are analyzable in size with a naked eye and an image recognition technique. The predetermined distance here may be tens of meters.

At S27, when the linear distance between the host vehicle and the different vehicle is determined to be within the predetermined distance in the distance determination processing (YES at S27), the flowchart proceeds to S28. When the linear distance between the host vehicle and the different vehicle is determined to be greater than the predetermined distance in the distance determination processing (NO at S27), the saving processing mentioned later is not performed, and the flowchart ends.

At S28, the saving section 291 performs the saving processing, and the flowchart ends. In the saving processing, vehicle exterior images and their timestamps within a predetermined time before and after a sudden deceleration of the different vehicle are read from the image temporary-storage portion 285, and saved in the memory 26. The time of the sudden deceleration of the different vehicle may use a time described in the timestamp of the different-vehicle information used to determine that the sudden deceleration has occurred in the different-vehicle sudden-deceleration determination processing.

In the saving processing, it is preferable that, in addition to the vehicle exterior images and their timestamps read from the image temporary-storage portion 285, the vehicle positions of the host vehicle and the vehicle positions of the different vehicle received from the communicator 3 of the different vehicle are associated with each other and saved in the memory 26.

As the vehicle position of the host vehicle, each terminal position provided with a timestamp closest to the timestamp of the different-vehicle information used to determine that the different vehicle has suddenly decelerated in the different-vehicle sudden-deceleration determination processing may be read from the terminal positions accumulated in the sensor information accumulation portion 282 of the host terminal.

Additionally, as the vehicle position of the host vehicle, each terminal position provided with a timestamp closest to the timestamp of each vehicle exterior image read from the image temporary storage portion 285 may be read from the terminal positions accumulated in the sensor information accumulation portion 282 of the host terminal. As the vehicle position of the different vehicle, the vehicle position in the different-vehicle information used to determine that a sudden deceleration has occurred in the different-vehicle sudden-deceleration determination processing may be used.

As above, the vehicle position of the host vehicle that has captured a vehicle exterior image and the vehicle position of the different vehicle whose forward area may have been included in the captured vehicle exterior image are recorded together with the captured vehicle exterior image. When the vehicle exterior image is inspected later, a position of a vehicle whose forward area has been imaged in the vehicle exterior image is therefore easily determined for easy inspection.

The vehicle exterior images saved in the memory 26 are, as above, transmitted to the server via the server communication portion 27. The vehicle exterior images transmitted to the server are applicable to investigations of accidents.

Here, effect of the first embodiment is specifically explained in reference to FIG. 1. As above, FIG. 1 illustrates a vehicle A that suddenly decelerates and vehicles B1 to B4 around the vehicle A. FIG. 1 illustrates areas Ar1 to Ar4 imaged in the imaging portions 25 of the vehicles B1 to B4 respectively.

The vehicles B1 to B4 are located to perform inter-vehicle communications with the vehicle A. The linear distance between the vehicle B3 and vehicle A is less than a predetermined distance. The linear distance between the vehicle A and each of the vehicles B1, B2, and B4 is no less than the predetermined distance. The imaging directions of the imaging portions 25 of the vehicles B1, B3, and B4 face the forward area of the vehicle A. The imaging direction of the imaging portion 25 of the vehicle B2 does not face the forward area of the vehicle A. On the assumption that, under the above condition, the imaging range of the vehicle B3 includes the forward area around the vehicle A and the imaging ranges of the vehicles B1, B2, B4 do not include the forward area around the vehicle A, the following explanation is made.

When the vehicle A has suddenly decelerated in response to rush-out of a pedestrian and a vehicle, the drive recorder units 1b of the vehicles B1 to B4 determine that the vehicle A has suddenly decelerated on the basis of the vehicle information transmitted from the communicator 3 of the vehicle A.

The drive recorder unit 1b of the vehicle B3 whose imaging range contains the forward area around the vehicle A saves vehicle exterior images sequentially captured in the imaging portion 25 into the memory 26. The vehicle exterior images in the forward direction of the vehicle A that has suddenly decelerated can therefore be captured from the vehicle B3 and saved.

The drive recorder units 1b of the vehicles B1, B2, B4 whose imaging ranges do not include the forward area around the vehicle A do not save the vehicle exterior images sequentially captured in the imaging portions 25 into the memory 26 even when the sudden deceleration of the vehicle A is determined. The vehicle exterior images including no forward area around the vehicle A are therefore prevented from being saved wastefully.

Conventional techniques, recording vehicle exterior images viewed from a host vehicle by using a drive recorder of the host vehicle, do not record the vehicle exterior image when the host vehicle impacts an obstacle and the drive recorder of the host vehicle is thus broken. In contrast, the first embodiment saves vehicle exterior images in the forward area of the vehicle A captured in the imaging portion 25 of the vehicle B3 around the vehicle A in the memory 26 of the vehicle B3. Even when the vehicle A impacts an obstacle, the vehicle exterior images in the forward area of the vehicle A are therefore not lost.

The first embodiment describes, but is not limited to, the configuration where S25 to S27 are processed. A configuration where S25 to S27 are not processed (hereinafter, a first modification) may be used.

The first embodiment describes, but is not limited to, the configuration performing the direction determination processing on the assumption that the imaging direction in the imaging portion 25 faces the forward direction of the host vehicle. Even when the imaging direction in the imaging portion 25 is offset from the forward direction of the host vehicle, the direction determination processing may be performed in response to an actual imaging direction (hereinafter, a second modification).

This second modification may be achieved as follows. First, the imaging direction of the imaging portion 25 relative to the host vehicle is previously saved in the memory of the in-terminal control unit 28. The in-terminal control unit 28 is therefore also called an imaging-direction saving portion. The imaging direction of the imaging portion 25 relative to the host vehicle (hereinafter, a host-vehicle reference imaging direction) may be an imaging direction of the imaging portion 25 relative to a forward direction of the host vehicle along the longitudinal axis of the host vehicle. The host-vehicle reference imaging direction may be input by the user's manipulation via an unillustrated manipulation input portion of the imaging-equipped mobile terminal 2, and previously saved in the memory of the in-terminal control unit 28.

The imaging-equipped mobile terminal 2 includes a geomagnetic sensor. When an orientation relative to a specific axis of the host terminal is detectable, the in-terminal control unit 28 may calculate the host-vehicle reference imaging direction as follows, and previously save the direction in the memory of the in-terminal control unit 28. Specifically, an offset between the travel direction of the host vehicle found as above and the orientation of the host terminal detected by the above geomagnetic sensor is calculated. The in-terminal control unit 28 finds the host-vehicle reference imaging direction from the correspondence between the calculated offset, the specific axis of the host terminal previously saved in the memory of the in-terminal control unit 28, and the imaging direction of the imaging portion 25, and saves the found imaging direction in the memory.

The second modification provides the direction determination processing that determines whether the orientation that is offset from the orientation of the host vehicle by an angle of the host-vehicle reference imaging direction faces the different-vehicle forward-imaging direction as the above imaging direction viewed from the host vehicle.

The second modification provides the direction determination processing to be performable in response to an actual imaging direction even when the imaging direction in the imaging portion 25 is offset from the forward direction of the host vehicle.

Second Embodiment

The present disclosure is not limited to the first embodiment. A second embodiment is also included within the technical scope of the present disclosure. The second embodiment is explained below. Conveniently, the components having the same functions as the components illustrated in the drawings used in the explanation of the above embodiment are given the same reference numerals, and not explained.

The drive recorder system 100 of the second embodiment is the same as the drive recorder system 100 of the first embodiment except that the drive recorder units 1b of the vehicles around the vehicle A do not save vehicle exterior images on the basis of the determination that the vehicle A has suddenly decelerated but the in-terminal control unit 28 of the drive recorder unit 1a of the vehicle A determines that the vehicle A has suddenly decelerated and transmits a request to save the vehicle exterior images to the surrounding vehicles. That is, the drive recorder system 100 of the second embodiment is the same as the drive recorder system 100 of the first embodiment except that part of the processing in the in-terminal control unit 28 and the in-communicator control unit 33 is different.

Figure 7:
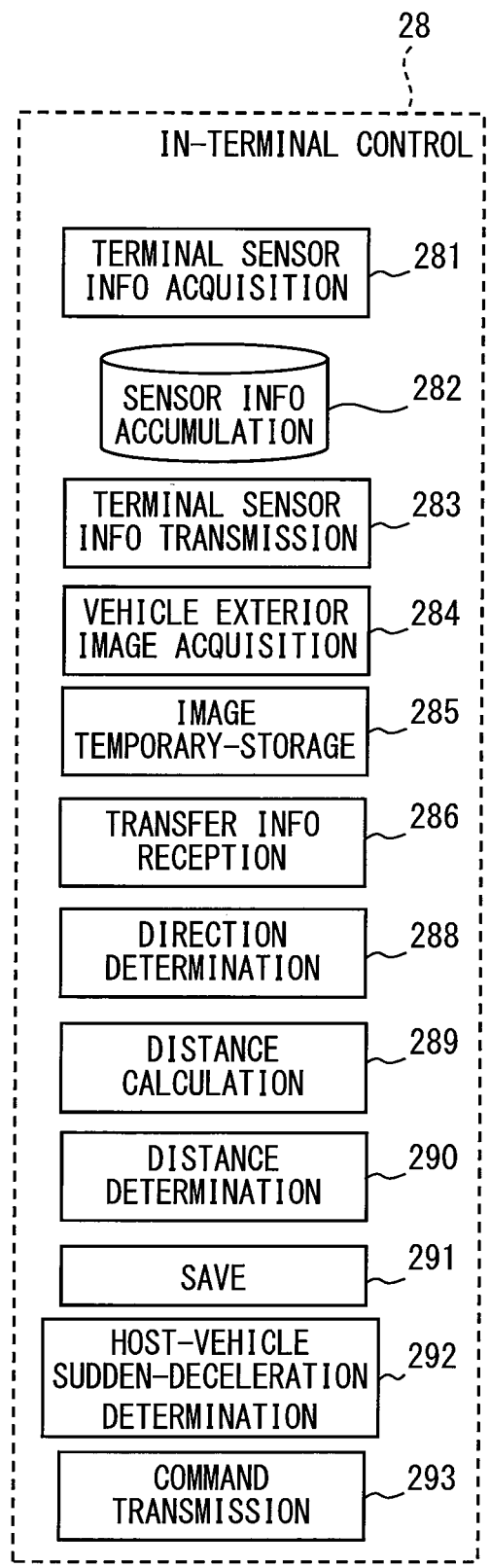
FIG. 7 is a functional block diagram illustrating an example of a schematic configuration of an in-terminal control unit in a second embodiment.

Here, a schematic configuration of the in-terminal control unit 28 of the second embodiment is explained in reference to FIG. 7. As in FIG. 7, the in-terminal control unit 28 of the second embodiment includes, as a functional block, the terminal sensor information acquisition section 281, sensor information accumulation portion 282, terminal sensor information transmission section 283, vehicle exterior image acquisition section 284, image temporary-storage portion 285, transfer information reception section 286, direction determination section 288, distance calculation section 289, distance determination section 290, saving section 291, host-vehicle sudden-deceleration determination section 292, and command transmission section 293.

The host-vehicle sudden-deceleration determination section 292 determines whether the host vehicle has suddenly decelerated on the basis of an imaging-directional acceleration out of accelerations detected in the acceleration sensor 23 of the host terminal as a longitudinal acceleration of the host vehicle, the imaging-directional acceleration arising in the same direction as the imaging direction of the imaging portion 25. The host-vehicle sudden-deceleration determination section 292 is also called a sudden-deceleration determination section. As one example, when the acceleration is a negative predetermined value or under, the host vehicle is determined to have suddenly decelerated. When the acceleration does not reach the negative predetermined value, the host vehicle is determined to have not suddenly decelerated. The predetermined value here is any value equivalent to a sudden deceleration.

The present embodiment describes, but is not limited to, the configuration where the host-vehicle sudden-deceleration determination section 292 determines whether the host vehicle has suddenly decelerated on the basis of the acceleration detected in the acceleration sensor 23 of the host terminal. The host-vehicle sudden-deceleration determination section 292 may determine whether the host vehicle has suddenly decelerated on the basis of the terminal positions of the host terminal. In this case, the vehicle speed of the host vehicle is calculated by calculating the travel of the host vehicle per unit of time from chronologically arranged multiple terminal positions. A time differential value of serially calculated vehicle speeds may be calculated and treated as a longitudinal acceleration of the host vehicle.

The command transmission section 293 transmits a command of a request to save the vehicle exterior image captured in the imaging portion 25 (hereinafter, a saving request command) to the communicator 3 via the in-terminal BT communication portion 21 when the host-vehicle sudden-deceleration determination section 292 determines that the host vehicle has suddenly decelerated.

In the in-communicator control unit 33 of the communicator 3, when the saving request command is received from the imaging-equipped mobile terminal 2 of the host vehicle, the vehicle information transmission section 332 transmits this saving request command to the surrounding vehicles via the inter-vehicle communication portion 32. The vehicle information transmission section 332 transmits the saving request command together with the vehicle information generated in the above to-be-transmitted vehicle information generation processing.

Then, the communicator 3 that has received the saving request command and vehicle information transmitted from the communicator 3 of the different vehicle transmits the received saving request command and vehicle information to the imaging-equipped mobile terminal 2 of the host vehicle. The imaging-equipped mobile terminal 2 that has received the saving request command and vehicle information performs the vehicle exterior image saving related processing of S23 to S28 in the in-terminal control unit 28 in response to reception of the saving request command.

The second embodiment describes, but is not limited to, the configuration where the in-terminal control unit 28 determines whether the host vehicle has suddenly decelerated. The in-communicator control unit 33 may determine whether the host vehicle has suddenly decelerated (hereinafter, a third modification).

This third modification provides the drive recorder system 100 that is the same as the drive recorder system 100 of the second embodiment except that, instead of the in-terminal control unit 28, the in-communicator control unit 33 determines whether the host vehicle has suddenly decelerated.

Figure 8:
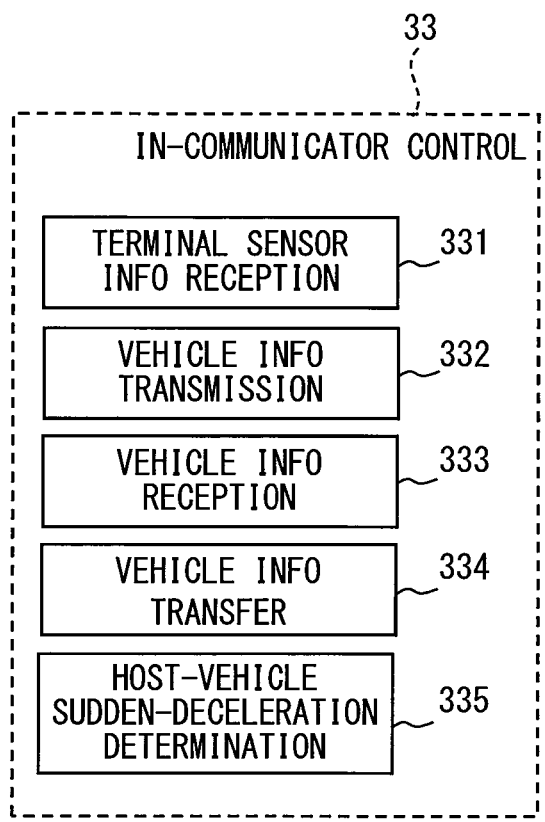
FIG. 8 is a functional block diagram illustrating an example of a schematic configuration of an in-communicator control unit in a third modification.

Here, a schematic configuration of the in-communicator control unit 33 of the third modification is explained in reference to FIG. 8. As in FIG. 7, the in-communicator control unit 33 of the third modification includes the terminal sensor information reception section 331, vehicle information transmission section 332, vehicle information reception section 333, vehicle information transfer section 334, and a host-vehicle sudden-deceleration determination section 335 as a functional block.

The in-terminal control unit 28 of the third modification is the same as the in-terminal control unit 28 of the second embodiment except that the in-terminal control unit 28 of the third modification does not include the host-vehicle sudden-deceleration determination section 292 and command transmission section 293 as a functional block.

The host-vehicle sudden-deceleration determination section 335 determines whether the host vehicle has suddenly decelerated in the same way as the host-vehicle sudden-deceleration determination section 292 except that the host-vehicle sudden-deceleration determination section 335 uses terminal sensor information about the host terminal received via the in-communicator BT communication portion 31. The host-vehicle sudden-deceleration determination section 335 is therefore also called a sudden-deceleration determination section. The drive recorder unit 1a is also called an inter-vehicle communication apparatus.

The vehicle information transmission section 332 transmits a command of a request to save the vehicle exterior image captured in the imaging portion 25 (namely, a saving request command) to the surrounding vehicles via the inter-vehicle communication portion 32 when the host-vehicle sudden-deceleration determination section 292 determines that the host vehicle has suddenly decelerated. The vehicle information transmission section 332 transmits the saving request command together with the vehicle information generated in the above to-be-transmitted vehicle information generation processing.

Also according to the second embodiment and third modification, vehicle exterior images of a vehicle that has suddenly decelerated can be captured from a viewpoint of vehicles other than the vehicle that has suddenly decelerated and can be saved. A combination between the second embodiment or the third modification and first modification or second modification may be made.

In the vehicle exterior image saving related processing, when the saving processing is performed without the direction determination processing and distance determination processing in response to reception of the saving request command, the vehicle information transmission section 332 may not necessarily transmit vehicle information together with the saving request command.

Third Embodiment

The present disclosure is not limited to the first and second embodiments. A third embodiment is included in the technical scope of the present disclosure. The embodiment is explained below. Conveniently, the components having the same functions as in the drawings used in the explanation of the above embodiments are given the same numerals and are not explained.

The drive recorder system 100 of the third embodiment is the same as the drive recorder system 100 of the second embodiment except that the drive recorder system 100 does not transmit a request to save vehicle exterior images to surrounding vehicles and the drive recorder unit 1b of the vehicle around the vehicle A transmits a result of determination that the vehicle A has suddenly decelerated to the surrounding vehicles. That is, the drive recorder system 100 of the third embodiment is the same as the drive recorder system 100 of the second embodiment except that part of the processing in the in-terminal control unit 28 and in-communicator control unit 33 is different.

Figure 9:
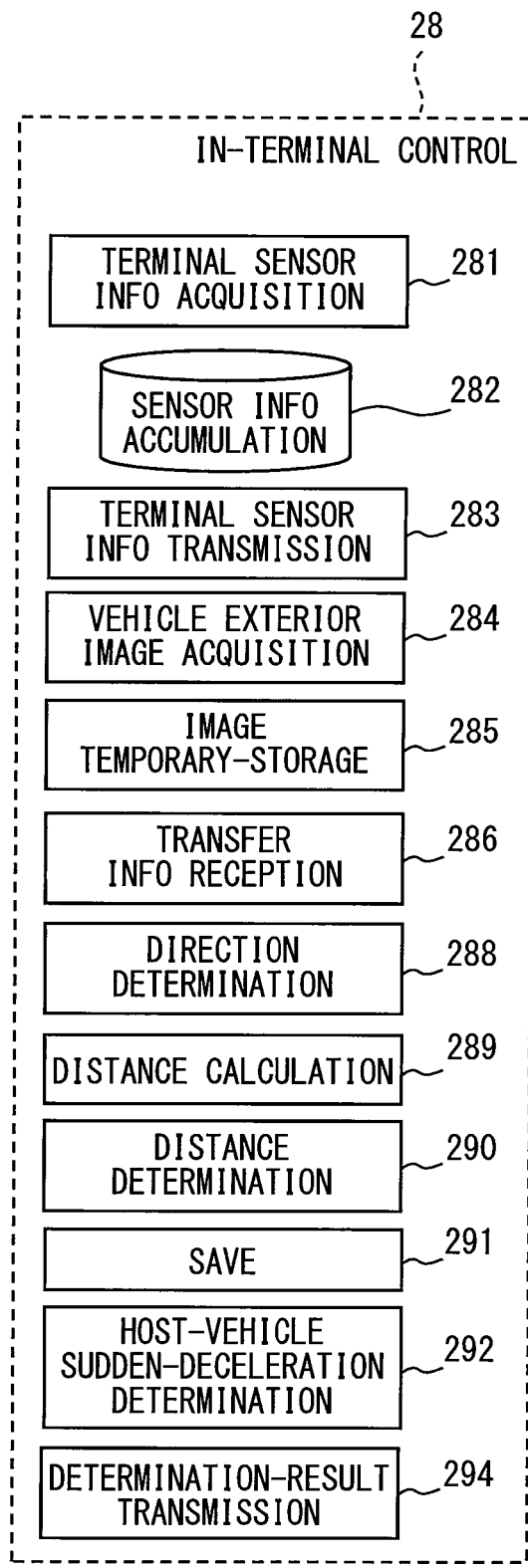
FIG. 9 is a functional block diagram illustrating an example of a schematic configuration of an in-terminal control unit in a third embodiment.

A schematic configuration of the in-terminal control unit 28 of the third embodiment is explained in reference to FIG. 9. As illustrated in FIG. 9, the in-terminal control unit 28 of the third embodiment includes, as a functional block, the terminal sensor information acquisition section 281, sensor information accumulation portion 282, terminal sensor information transmission section 283, vehicle exterior image acquisition section 284, image temporary-storage portion 285, transfer information reception section 286, direction determination section 288, distance calculation section 289, the distance determination section 290, saving section 291, host-vehicle sudden-deceleration determination section 292, and a determination-result transmission section 294.

When the host-vehicle sudden-deceleration determination section 292 determines that the host vehicle has suddenly decelerated, the determination-result transmission section 294 transmits this determination result (hereinafter, a sudden-deceleration determination result) to the communicator 3 via the in-terminal BT communication portion 21.

In the in-communicator control unit 33 of the communicator 3, when the sudden-deceleration determination result is transmitted from the imaging-equipped mobile terminal 2 of the host vehicle, the vehicle information transmission section 332 transmits this sudden-deceleration determination result to the surrounding vehicles via the inter-vehicle communication portion 32. The vehicle information transmission section 332 transmits the sudden-deceleration determination result together with the vehicle information generated in the to-be-transmitted vehicle information generation processing.

Then, the communicator 3 that has received the sudden-deceleration determination result and vehicle information transmitted from the communicator 3 of the different vehicle transmits the received sudden-deceleration determination result and vehicle information to the imaging-equipped mobile terminal 2 of the host vehicle. In the imaging-equipped mobile terminal 2 that has received the sudden-deceleration determination result and vehicle information, the in-terminal control unit 28 performs S23 to S28 in response to reception of the sudden-deceleration determination result.

Also according to the configuration of the third embodiment, the vehicle exterior image of the vehicle that has suddenly decelerated can be captured from a vehicle other than the vehicle that has suddenly decelerated, and saved. The third embodiment and first to third modifications may be combined.

In the vehicle exterior image saving related processing, when saving is performed without performing the direction determination processing and distance determination processing in response to reception of the sudden-deceleration determination result, the vehicle information transmission section 332 does not necessarily transmit the vehicle information together with the sudden-deceleration determination result.

The first to third embodiments describe, but are not limited to, the configuration where, in the direction determination processing, the direction determination section 288 determines whether the imaging direction of the imaging portion 25 of the host terminal faces the different-vehicle forward-imaging direction on the basis of the vehicle position and orientation of the different vehicle received from the communicator 3 of the different vehicle and the vehicle position and orientation of the host vehicle. In the direction determination processing, the direction determination section 288 may determine whether the imaging direction of the imaging portion 25 of the host terminal faces to image the surrounding of the different vehicle (hereinafter, a different-vehicle surrounding imaging direction) on the basis of the vehicle position and orientation of the different vehicle received from the communicator 3 of the different vehicle and the vehicle position and orientation of the host vehicle.

It may be determined whether the imaging direction of the imaging portion 25 of the host terminal faces the different-vehicle surrounding imaging direction as follows. First, in the two-dimensional coordinate of a y-axis of the latitude and an x-axis of the longitude, a shortest distance between a straight line extending from the vehicle position of the host vehicle toward the orientation of the host vehicle (hereinafter, a host-vehicle imaging-direction straight line) and the vehicle position of the different vehicle is calculated. The above shortest distance is found by calculating a linear distance between a coordinate where a vertical line that drops from a coordinate of the vehicle position of the different vehicle to the host-vehicle imaging-direction straight line intersects the host-vehicle imaging direction straight line and a coordinate of the vehicle position of the different vehicle. When this shortest distance is a predetermined threshold or less, it is determined that the imaging direction of the imaging portion 25 of the host terminal faces the different-vehicle surrounding imaging direction. When the shortest distance is longer than the predetermined threshold, it is determined that the imaging direction of the imaging portion 25 of the host terminal does not face the different-vehicle surrounding imaging direction. The predetermined threshold here is a freely settable value, for example, tens of meters.

When the imaging direction of the imaging portion 25 of the host terminal does not face a predetermined range within tens of meters around the different vehicle, it is thus determined that the imaging direction of the imaging portion 25 of the host terminal does not face the different-vehicle surrounding imaging direction in the direction determination processing. In the saving processing mentioned later, the vehicle exterior images that do not include the area around the different vehicle can thus be prevented from being wastefully saved.

In the direction determination processing, when it is determined whether the imaging direction of the imaging portion 25 of the host terminal faces the different-vehicle surrounding imaging direction, the different-vehicle forward imaging direction in each process of the vehicle exterior image saving related processing is read as the different-vehicle surrounding imaging direction.

The first to third embodiments describe, but are not limited to, the configuration where the imaging portion 25 of the imaging-equipped mobile terminal 2 is used as the imaging portion that captures vehicle exterior images. For example, a vehicle mounted camera mounted to a vehicle may be used as the imaging portion that captures vehicle exterior images. In this case, a vehicle mounted apparatus other than the imaging-equipped mobile terminal 2 and the communicator 3 may perform the processing equivalent to the vehicle exterior image saving related processing.

The first to third embodiments describe, but are not limited to, the configuration where the position, acceleration, and orientation of the vehicle are found from the terminal sensor information of the imaging-equipped mobile terminal 2. The position, acceleration, and orientation of the vehicle may be acquired from a sensor, ECU, and navigation apparatus that are mounted to a vehicle via a vehicle mounted LAN.

While the present disclosure has been described with reference to embodiments thereof, it is to be understood that the disclosure is not limited to the embodiments and constructions. The present disclosure is intended to cover various modification and equivalent arrangements. In addition,

The invention claimed is:

1. A vehicle exterior image saving system comprising:
a vehicle exterior image saving apparatus used in a first vehicle; and
an inter-vehicle communication apparatus used in a second vehicle that is different from the first vehicle,
the vehicle exterior image saving apparatus including:
a vehicle exterior image acquisition section that acquires a vehicle exterior image in a forward direction of the first vehicle, the vehicle exterior image being captured by an imaging apparatus used in the first vehicle;
a saving section that saves the vehicle exterior image acquired in the vehicle exterior image acquisition section; and
a first communication section that transmits and receives information by inter-vehicle communication,
the inter-vehicle communication apparatus including:
a sudden-deceleration information acquisition section that acquires vehicle information about the second vehicle to determine a sudden deceleration of the second vehicle; and
a second communication section that transmits and receives information by the inter-vehicle communication,
either the inter-vehicle communication apparatus or the vehicle exterior image saving apparatus including
a sudden-deceleration determination section that makes a determination as to whether or not a sudden deceleration arises in the second vehicle from the vehicle information acquired in the sudden-deceleration information acquisition section,
wherein:
the saving section of the vehicle exterior image saving apparatus saves the vehicle exterior image in the forward direction of the first vehicle, the vehicle exterior image being acquired in the vehicle exterior image acquisition section, on a basis of the determination, made by the sudden-deceleration determination section, that the sudden deceleration arises in the second vehicle;
the inter-vehicle communication apparatus transmits position determination information that enables a determination of a vehicle position of the second vehicle by using the second communication section;
the vehicle exterior image saving apparatus includes
a direction determination section that determines whether an imaging direction of the imaging apparatus faces a second-vehicle surrounding imaging direction to image a surrounding of the second vehicle on a basis of
the position determination information that the first communication section receives from the second vehicle and
a vehicle position and orientation of the first vehicle; and
when the direction determination section determines that the imaging direction of the imaging apparatus faces the second-vehicle surrounding imaging direction,
the saving section saves the vehicle exterior image in the forward direction of the first vehicle, the vehicle exterior image being acquired in the vehicle exterior image acquisition section, on a basis of the determination that the sudden deceleration arises in the second vehicle made by the sudden-deceleration determination section, whereas
when the direction determination section determines that the imaging direction of the imaging apparatus does not face the second-vehicle surrounding imaging direction,
the saving section does not save the vehicle exterior image in the forward direction of the first vehicle, the vehicle exterior image being acquired in the vehicle exterior image acquisition section.

2. The vehicle exterior image saving system according to claim 1, wherein:
the vehicle exterior image saving apparatus includes
a distance calculation section that calculates a distance between the first vehicle and the second vehicle on a basis of the position determination information that the first communication section receives from the second vehicle and the vehicle position of the first vehicle; and
when a distance calculated by the distance calculation section is a predetermined distance or more even in cases that the direction determination section determines that the imaging direction of the imaging apparatus faces the second-vehicle surrounding imaging direction,
the saving section does not save the vehicle exterior image in the forward of the first vehicle, the vehicle exterior image being acquired in the vehicle exterior image acquiring section.

3. The vehicle exterior image saving system according to claim 1, wherein:
the vehicle exterior image saving apparatus includes
an imaging-direction saving portion that previously saves the imaging direction of the imaging apparatus relative to the first vehicle; and
the direction determination portion determines whether the imaging direction of the imaging apparatus faces the second-vehicle surrounding imaging direction on a basis of
the position determination information that the first communication section receives from the second vehicle,
the vehicle position and orientation of the first vehicle, and
the imaging direction saved in the imaging-direction saving portion.

4. A vehicle exterior image saving system comprising:
a vehicle exterior image saving apparatus used in a first vehicle; and
an inter-vehicle communication apparatus used in a second vehicle that is different from the first vehicle,
the vehicle exterior image saving apparatus including:
a vehicle exterior image acquisition section that acquires a vehicle exterior image in a forward direction of the first vehicle, the vehicle exterior image being captured by an imaging apparatus used in the first vehicle;
a saving section that saves the vehicle exterior image acquired in the vehicle exterior image acquisition section; and
a first communication section that transmits and receives information by inter-vehicle communication,
the inter-vehicle communication apparatus including:

a sudden-deceleration information acquisition section that acquires vehicle information about the second vehicle to determine a sudden deceleration of the second vehicle; and a second communication section that transmits and receives information by the inter-vehicle communication, either the inter-vehicle communication apparatus or the vehicle exterior image saving apparatus including a sudden-deceleration determination section that makes a determination as to whether or not a sudden deceleration arises in the second vehicle from the vehicle information acquired in the sudden-deceleration information acquisition section, wherein:

the saving section of the vehicle exterior image saving apparatus saves the vehicle exterior image in the forward direction of the first vehicle, the vehicle exterior image being acquired in the vehicle exterior image acquisition section, on a basis of the determination, made by the sudden-deceleration determination section, that the sudden deceleration arises in the second vehicle;

the inter-vehicle communication apparatus transmits the vehicle information acquired in the sudden-deceleration information acquisition section by using the second communication section;

the vehicle exterior image saving apparatus includes the sudden-deceleration determination section;

the sudden-deceleration determination section makes the determination as to whether the sudden deceleration arises in the second vehicle from the vehicle information that the first communication section receives from the second vehicle; and when the sudden-deceleration determination section makes the determination that the sudden deceleration arises in the second vehicle, the saving section of the vehicle exterior image saving apparatus saves the vehicle exterior image in the forward direction of the first vehicle, the vehicle exterior image being acquired in the vehicle exterior image acquisition section.

5. A vehicle exterior image saving system comprising:

a vehicle exterior image saving apparatus used in a first vehicle; and an inter-vehicle communication apparatus used in a second vehicle that is different from the first vehicle, the vehicle exterior image saving apparatus including:

a vehicle exterior image acquisition section that acquires a vehicle exterior image in a forward direction of the first vehicle, the vehicle exterior image being captured by an imaging apparatus used in the first vehicle;

a saving section that saves the vehicle exterior image acquired in the vehicle exterior image acquisition section; and a first communication section that transmits and receives information by inter-vehicle communication, the inter-vehicle communication apparatus including:

a sudden-deceleration information acquisition section that acquires vehicle information about the second vehicle to determine a sudden deceleration of the second vehicle; and a second communication section that transmits and receives information by the inter-vehicle communication, either the inter-vehicle communication apparatus or the vehicle exterior image saving apparatus including a sudden-deceleration determination section that makes a determination as to whether or not a sudden deceleration arises in the second vehicle from the vehicle information acquired in the sudden-deceleration information acquisition section, wherein:

the saving section of the vehicle exterior image saving apparatus saves the vehicle exterior image in the forward direction of the first vehicle, the vehicle exterior image being acquired in the vehicle exterior image acquisition section, on a basis of the determination, made by the sudden-deceleration determination section, that the sudden deceleration arises in the second vehicle;

the inter-vehicle communication apparatus includes the sudden-deceleration determination section;

the sudden-deceleration determination section makes the determination as to whether the sudden deceleration arises in the second vehicle from the vehicle information acquired in the sudden-deceleration information acquisition section, and transmits a saving request to save the vehicle exterior image in the forward direction of the first vehicle, the vehicle exterior image being captured in the vehicle exterior image acquisition section, by using the second communication section when the sudden-deceleration determination section makes the determination that the sudden deceleration arises in the second vehicle; and the saving section of the vehicle exterior image saving apparatus saves the vehicle exterior image in the forward direction of the first vehicle, the vehicle exterior image being acquired in the vehicle exterior image acquisition section, on a basis of reception of the saving request from the second vehicle by using the first communication section.

6. A vehicle exterior image saving system comprising:

a vehicle exterior image saving apparatus used in a first vehicle; and an inter-vehicle communication apparatus used in a second vehicle that is different from the first vehicle, the vehicle exterior image saving apparatus including:

a vehicle exterior image acquisition section that acquires a vehicle exterior image in a forward direction of the first vehicle, the vehicle exterior image being captured by an imaging apparatus used in the first vehicle;

a saving section that saves the vehicle exterior image acquired in the vehicle exterior image acquisition section; and a first communication section that transmits and receives information by inter-vehicle communication, the inter-vehicle communication apparatus including:

a sudden-deceleration information acquisition section that acquires vehicle information about the second vehicle to determine a sudden deceleration of the second vehicle; and a second communication section that transmits and receives information by the inter-vehicle communication, either the inter-vehicle communication apparatus or the vehicle exterior image saving apparatus including a sudden-deceleration determination section that makes a determination as to whether or not a sudden deceleration arises in the second vehicle from the vehicle information acquired in the sudden-deceleration information acquisition section, wherein:

the saving section of the vehicle exterior image saving apparatus saves the vehicle exterior image in the forward direction of the first vehicle, the vehicle exterior image being acquired in the vehicle exterior image acquisition section, on a basis of the determination, made by the sudden-deceleration determination section, that the sudden deceleration arises in the second vehicle;

the inter-vehicle communication apparatus includes the sudden-deceleration determination section;

the sudden-deceleration determination section makes the determination as to whether the sudden deceleration arises in the second vehicle from the vehicle information acquired in the sudden-deceleration information acquisition section;

when the sudden-deceleration determination section makes the determination that the sudden deceleration arises in the second vehicle, the second communication section transmits a determination result in the sudden-deceleration determination section; and the saving portion of the vehicle exterior image saving apparatus saves the vehicle exterior image in the forward direction of the first vehicle, the vehicle exterior image being acquired in the vehicle exterior image acquisition section, on a basis of reception of the determination result from the second vehicle by using the first communication section.

7. A vehicle exterior image saving apparatus that is used in the vehicle exterior image saving system according to claim 1.

8. A vehicle exterior image saving apparatus that is used in the vehicle exterior image saving system according to claim 4.

9. A vehicle exterior image saving apparatus that is used in the vehicle exterior image saving system according to claim 5.

10. A vehicle exterior image saving apparatus that is used in the vehicle exterior image saving system according to claim 6.

11. An inter-vehicle communication apparatus that is used in the vehicle exterior image saving system according to claim 5.

12. An inter-vehicle communication apparatus that is used in the vehicle exterior image saving system according to claim 6.

13. A mobile terminal that is used in the vehicle exterior image saving apparatus included in the vehicle exterior image saving system according to claim 4, the vehicle exterior image saving apparatus including
an imaging-equipped mobile terminal and a communicator,
the imaging-equipped mobile terminal including:
the vehicle exterior image acquisition section;
the saving section; and
the sudden-deceleration determination section, and
the communicator including the first communication section.

14. A mobile terminal that is used in the vehicle exterior image saving apparatus included in the vehicle exterior image saving system according to claim 5, the vehicle exterior image saving apparatus including:
an imaging-equipped mobile terminal including the vehicle exterior image acquisition section and the saving section; and
a communicator including the first communication section.

15. A mobile terminal that is used in the vehicle exterior image saving apparatus included in the vehicle exterior image saving system according to claim 6, the vehicle exterior image saving apparatus including:
an imaging-equipped mobile terminal including the vehicle exterior image acquisition section and the saving section; and
a communicator including the first communication section.

* * * * *